United States Patent
Henson et al.

(10) Patent No.: US 6,459,701 B1
(45) Date of Patent: Oct. 1, 2002

(54) VARIABLE ACCESS FAIRNESS IN A FIBRE CHANNEL ARBITRATED LOOP

(75) Inventors: Karl Henson, Rancho Santa Margarita; Raul Oteyza, Lakewood, both of CA (US)

(73) Assignee: Emulex Corporation, Costa Mesa, CA (US)

( * ) Notice: Subject to any disclaimer, the term of this patent is extended or adjusted under 35 U.S.C. 154(b) by 0 days.

(21) Appl. No.: 09/370,096

(22) Filed: Aug. 6, 1999

(51) Int. Cl.[7] ........................... H04L 12/28; H04L 12/43
(52) U.S. Cl. ........................................ 370/405; 370/461
(58) Field of Search ............................... 370/455, 461, 370/462, 452, 453, 454, 401–405

(56) References Cited

U.S. PATENT DOCUMENTS

| | | | |
|---|---|---|---|
| 5,535,035 A | * 7/1996 | DeFoster et al. | 359/161 |
| 5,598,541 A | 1/1997 | Malladi | |
| 5,751,715 A | * 5/1998 | Chan et al. | 370/455 |
| 5,754,549 A | 5/1998 | DeFoster et al. | |
| 5,922,077 A | 7/1999 | Espy et al. | |
| 5,978,379 A | * 11/1999 | Chan et al. | 370/403 |
| 5,991,891 A | * 11/1999 | Haln et al. | 714/4 |
| 6,055,228 A | * 4/2000 | DeKoning et al. | 370/258 |
| 6,061,360 A | * 5/2000 | Miller et al. | 370/455 |

* cited by examiner

Primary Examiner—Alpus H. Hsu
Assistant Examiner—Toan D. Nguyen
(74) Attorney, Agent, or Firm—Fish & Richardson P.C.

(57) ABSTRACT

A method whereby a fair port in a Fibre Channel Arbitrated Loop behaves unfairly during portions of its loop tenancy and behaves fairly during other portions. In a preferred implementation, the fair port establishes a first loop circuit with an initial destination port during a loop tenancy. Before relinquishing control of the loop to an arbitrating port, the fair port—under the control of a transfer protocol—establishes one or more subsequent loop circuits with other destination ports. Loop circuits are established in sequence without the fair port relinquishing control of the loop and rearbitrating. This continues until (1) the fair port establishes a loop circuit with every destination port to which it desires to exchange information; (2) a fixed time period has lapsed; and/or (3) a predefined maximum number of loop circuits are established.

18 Claims, 2 Drawing Sheets

VARIABLE ACCESS FAIRNESS IN A FIBRE CHANNEL ARBITRATED LOOP

TECHNICAL FIELD

The invention relates to fibre channel arbitrated loop protocols, and more particularly, to a system and method of efficiently transmitting packets from a single source node to multiple target nodes.

BACKGROUND

In a Fibre Channel Arbitrated Loop (FCAL) topology, the "loop" is a resource shared by all ports. An arbitration protocol provides controlled access to the loop by the individual ports (device nodes) connected thereto. This protocol ensures that information sent from one port does not interfere with information sent from a different port. This is achieved by ensuring that only one port "owns" the loop at any time.

Before a source port can establish a loop circuit with one another port and begin frame transmission, the source port must arbitrate for access to the loop and win the arbitration. If more than one port requires access to the loop at the same time, each port arbitrates and the protocol determines which port wins the arbitration. Ports that fail to win arbitration may continue to arbitrate in order to win arbitration after the current loop circuit closes.

The above arbitration protocol resolves simultaneous arbitration requests based on each port's loop address. Each loop address has an associated fixed priority that determines which port wins arbitration. If the higher-priority ports were allowed to arbitrate whenever they wanted, lower-priority ports might not be able to gain access to the loop at all. To prevent higher-priority ports from monopolizing access to the loop, the arbitration protocol uses "access fairness" rules. These access fairness rules establish an access fairness window during the period when multiple ports are arbitrating. During this window, each port observing access fairness is limited to win arbitration one time. Once a port has won arbitration, it must wait until a new access fairness window begins before it can arbitrate again. When all ports that are arbitrating during the current window have won arbitration, the access fairness window is reset and ports that were waiting can begin arbitrating if they require the loop. Ports that observe access fairness are called "fair ports". Those that do not are called "unfair ports". The decision of whether to behave fairly or unfairly is left to the system designer and may be fixed or dynamically changeable, depending on the workload. Some applications may benefit by allowing one or more ports to be unfair while requiring the remainder to observe access fairness.

After a port has won arbitration, a "loop circuit" is established with another port. The loop circuit is a logical connection between two ports conditioned for frame transmission and reception with each other. Other ports on the loop are either idle and monitoring the loop, or require accesses of their own and are arbitrating for access once the current loop circuit is closed. When the ports have completed their frame transmission, the loop circuit is closed and the loop is made available for use by other ports.

At the present, a transfer protocol is used to improve the efficiency of access fairness in a loop under certain circumstances. The transfer protocol includes rules for performing a "transfer operation" whereby a current owner of the loop (i.e., the "fair" port that won arbitration) may close a currently open loop circuit (without relinquishing control of the loop and rearbitrating) to establish a new loop circuit with a different device. This might be desirable, for example, when a device wishes to have a file copied to multiple destination devices on the loop. A transfer operation thus allows ports with frames for multiple destinations to transmit those frames in a succession of loop circuits during a single loop ownership. This greatly reduces the overhead associated with arbitration since a current owner of the loop does not have to rearbitrate for access to the loop.

A transfer operation can occur regardless of whether the current owner of the loop won arbitration fairly or unfairly. Thus it makes sense that the transfer operation rules for unfair ports allow the current owner to ignore any arbitrating port. A fair port, on the other hand, by definition, must behave fairly. Consequently, any new transfer operation is ignored and control is relinquished to the winning arbitrating port. Thus, a fair port cannot take advantage of the improved frame transmission efficiencies of the transfer protocol if another port is arbitrating.

The inventors have found that by allowing a fair port to sometimes behave unfairly substantial performance improvements can be realized.

In some known FCAL implementations, a loop may selectively choose to be fair or unfair. In such cases, the decision to be fair or unfair is controlled by firmware or hardware located at the port and may be altered dynamically as conditions dictate. This allows for a loop port to dynamically assess frame transmission activity and respond by behaving fairly during periods of normal activity, but switch to unfair behavior during periods of peak activity. None of these implementations, however, suggest making a fair port (i.e., a port that has won arbitration fairly) behave unfairly. Instead, a port is designated as either fair or unfair before arbitrating and maintains that function for the entirety of its loop tenancy.

SUMMARY

The invention relates to a method whereby a fair port in a Fibre Channel Arbitrated Loop behaves unfairly during portions of its loop tenancy and behaves fairly during other portions. In a preferred implementation, the fair port establishes a first loop circuit with an initial destination port. Before relinquishing control of the loop to an arbitrating port, the fair port establishes one or more subsequent loop circuits with other destination ports. Loop circuits are established in sequence without the fair port relinquishing control of the loop and rearbitrating. This continues until (1) the fair port establishes a loop circuit with every destination port to which it desires to exchange information; (2) a fixed time period has lapsed; and/or (3) a predefined maximum number of loop circuits are established.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference numbers and designations in the various drawings indicate like elements.

DETAILED DESCRIPTION

Overview

The invention relates to a method whereby a fair port in a Fibre Channel Arbitrated Loop (FCAL) behaves unfairly during portions of its loop tenancy and behaves fairly during other portions. In a preferred implementation, the fair port establishes a first loop circuit with an initial destination port. Before relinquishing control of the loop to an arbitrating port, the fair port—under the control of a transfer protocol—establishes one or more subsequent loop circuits with other destination ports. Loop circuits are established in sequence without the fair port relinquishing control of the loop and rearbitrating. This continues until (1) the fair port establishes a loop circuit with every destination port to which it desires to exchange information; (2) a fixed time period has lapsed; and/or (3) a predefined maximum number of loop circuits are established.

A port is typically a fibre channel host adapter card. This card is programmably configurable to execute the arbitration protocol process that allow devices attached thereto to gain control of the loop. The card also executes the transfer protocol process that allow a current owner of the loop to transmit to more than one device (i.e., to perform one or more transfer operations).

The arbitration protocol allows an initiator port to win arbitration so it may transmit and receive data to/from other ports on the loop. It is contemplated that the initiator port may be of the type that is adaptable to win arbitration fairly or unfairly and to do so statically or dynamically based on system configuration and desired performance parameters. The invention, however, is only applicable when the initiator port wins arbitration pursuant to normal access fairness rules. In other words, the invention applies when the initiator port is a "fair port".

After a fair port wins control of the loop, a loop circuit connection between the device (i.e., current owner of the loop) coupled to the fair port and a first destination device is established. This is done using conventional methods. To open a new (second) loop circuit and close the initial loop circuit, the transfer protocol process is invoked.

In accordance with an embodiment of the invention, the transfer protocol process is adapted to permit transfer operations regardless of whether other ports are seeking control of the loop. Thus, a fair port when operated in transfer mode is adapted to inherently behave "unfairly". In the current implementation, unfairness is limited to transfer operations and not to arbitration.

When the initiator port is done transmitting to all the devices (or is otherwise interrupted by the transfer protocol process), the transfer protocol process is terminated and the fair port goes back to behaving like a fair port. This means giving up control to the loop pursuant to conventional access fairness rules dictated by the arbitration protocol process.

Figure 1:
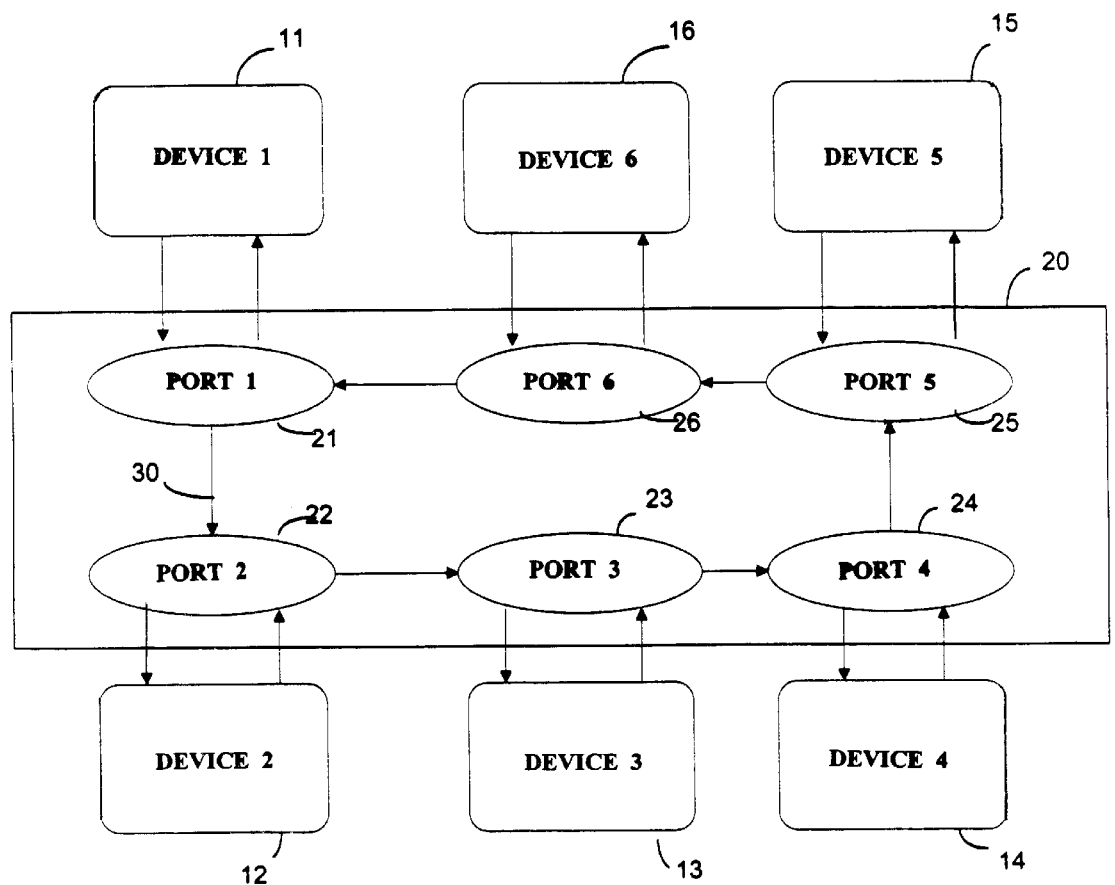
FIG. 1 is an overall architecture diagram of an exemplary Fibre Channel Arbitrated Loop in accordance with the invention.

FIG. 1 shows a FCAL 10 comprised of a plurality of devices 11–16 coupled to a common loop 20 via their associated loop-capable ports 21–26. As previously explained, loop-capable ports 21–26 may be fibre channel host adapter cards, or may be integrally formed as part of the system architecture of the associated device. Devices 11–16 may be for example storage devices, workstations and file servers. The FCAL topology allows such devices to be connected together to serve, for example, as a high-performance network and storage interface in a departmental cluster. The ring or loop configured ports are connected by uni-directional links 30 that together form fibre channel connections. These connections facilitate shared access to bandwidth among all the ports 21–26 via arbitration.

Each port includes appropriate hardware and firmware to handle the transmit and receive needs of the various devices 11–16. The arbitration and transfer protocols referred to herein are generally defined by the FCAL Rev 7.0 (FC-AL-2) ANSI specification. This ANSI specification defines general rules for providing access fairness arbitration, as well as for establishing loop circuits during transfer operations.

The invention to be explained below in greater detail takes advantage of the flexibility of the FCAL network protocols, as defined by the ANSI specification, to define an improved transfer operation methodology that improves bandwidth efficiency in a FCAL.

Figure 2:
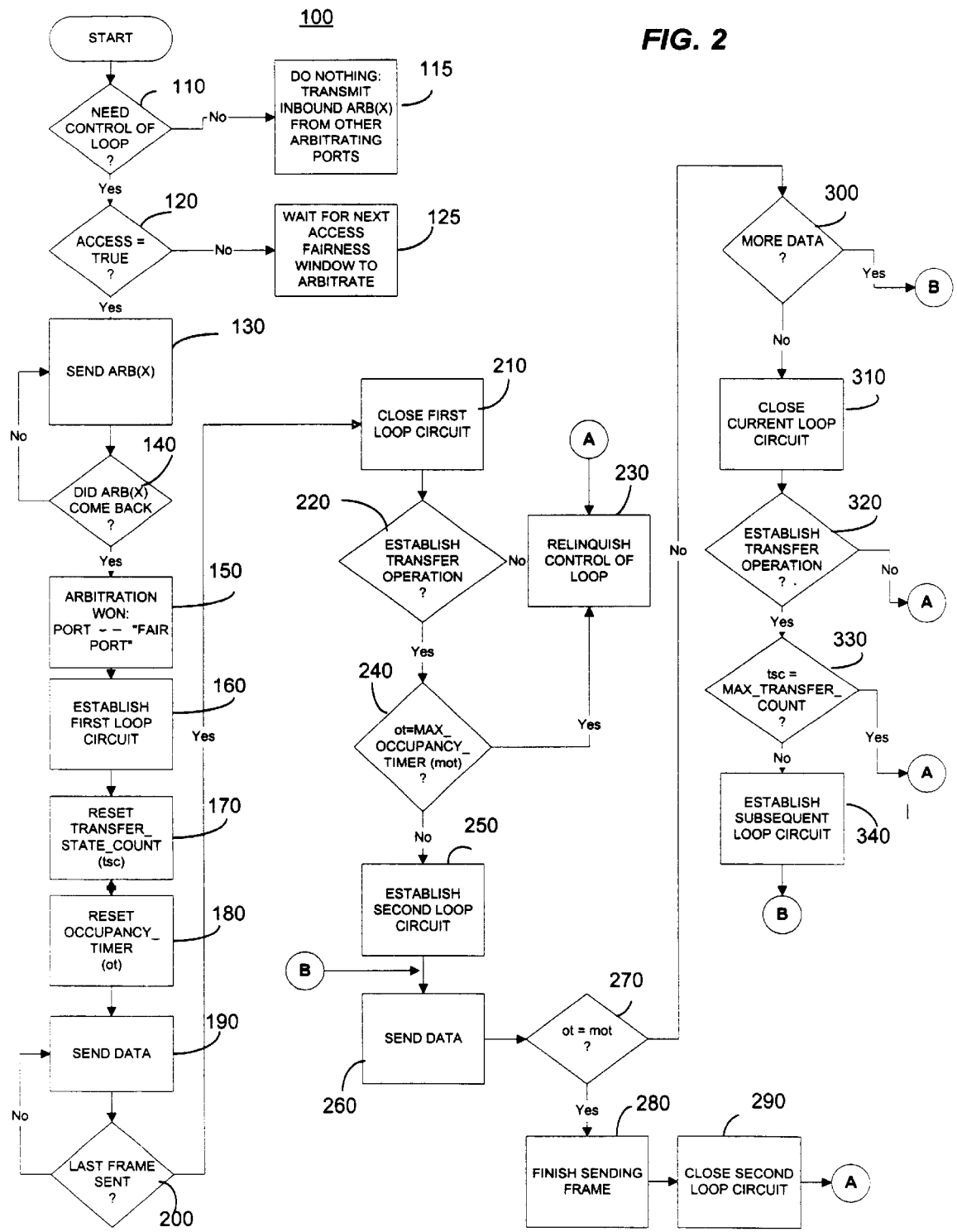
FIG. 2 is a an operational flow diagram showing arbitration and access fairness in accordance with an exemplary embodiment of the invention.

FIG. 2 depicts an operational flow diagram of the arbitration and transfer protocol processes according to an embodiment of the invention.

The transmission of sequences of frames from an initiator port to multiple ports (in sequence) begins with this initiating port recognizing that it needs to take control of the loop 20 (Step 110). At this time, an internal access bit is typically set and reset by the creation of loop circuits and by the monitoring of loop activity in each of the loop-capable ports 21–26. This access bit allows each port to determine whether it is free to arbitrate for control of the loop during a current access fairness window. The setting of the access bit is well understood in the art and forms no part of the invention.

In order to win arbitration and to do so fairly, the fair initiator port will first check its access bit. If this access bit is true (Step 120), the initiator port will send out an arbitration (ARB(x)) signal on the loop (Step 130). The initiator port continues to send out its own ARB(x) until its own ARB(x) is received back (Steps 140). This is because a port that is attempting to also gain control of the loop is similarly broadcasting its own ARB(x) signal. In accordance with access fairness rules, only arbitrating ports with an internal access bit currently set true will have the opportunity to win arbitration during the current access fairness window.

Similarly, if access is true and if the received ARB(x) is of lower priority, the initiator port replaces the inbound ARB(x) with its own ARB(x) request to all the ports connected and listening to the loop 20 (Step 120). (If the inbound ARB(X) is of higher priority, access fairness requires the initiator port to pass the inbound ARB(x) to the next listening port on the loop.) Thus, the initiator port continues to arbitrate (i.e. replace inbound lower priority ARB(x)'s with its own ARB(x)) until it receives back its own ARB(x). When it receives back its own ARB(x) request, the initiator port is free to transmit its frames (Step 150). The initiator port has won arbitration and is the current owner of the loop 20. Also, the port is a "fair port" since it has arbitrated fairly for control of the loop 20

A first loop circuit is eventually established between the fair port and any of the destination ports with which it is able to establish a connection and to which the fair port currently desires to transmit or receive data (Step 160). In a preferred implementation, once a loop circuit is established, the fair port resets a transfer_state_count variable to an initial count equal to zero (Step 170). This transfer_state_count is incremented each time a transfer operation is initiated by the fair port. An occupancy_timer variable is also set to an initial timer count also equal to zero (Step 180). This occupancy_timer variable keeps track of how much time the port has control of the loop 20.

Frame sequences of data intended for the destination port currently connected to receive information are transmitted from the fair port to that destination port (Step 160). This transmission continues uninterrupted until there are no more frames to send to that destination port (Step 200).

The fair port is eventually done transmitting on this first loop circuit and can close the circuit (Step 210). When additional frames need to be sent to a different destination port, i.e., a transfer operation is necessary (Step 220), the current loop owner (i.e., the fair port) invokes the transfer protocol to allow the fair port to continue to hold control of the loop 20 without rearbitrating. If the fair port does not need to transmit frames to another port, a transfer operation is unnecessary and the fair port will relinquish control of the loop 20. If the access fairness window is still open (i.e., at least one other port is transmitting its own ARB(x)), then fairness access rules dictate that such ports be allowed to gain control of the loop 20 before a new fairness access window is open. When a new window is open, control of the loop 20 by each port will again be allowed only once and on a first-to-access basis, unless devices have priority to dictate otherwise.

Under normal access fairness rules, the fair port is allowed to send frames to a newly designated destination port with which it could establish a new loop circuit, but only if another port is not arbitrating. This continues to be true with the current invention, except a new loop circuit is established even when another port is waiting to gain control of the loop 20. The fair port just ignores the request for loop control by that other waiting port. The transfer protocol will perform a transfer operation establishing a second loop circuit with that newly designated destination port (Step 250).

The fair port may compare a current occupancy_timer variable value to a max_occupancy_time value either during or just before establishing this second loop circuit (Step 240). When these two values are equal, the fair port has exceeded a predetermined frame transmission period and must relinquish control of the loop 20. If a loop circuit is already active when the comparison is made (Step 270), the fair port will wait to transmit a complete frame (Step 280), close the loop circuit (Step 290), and then relinquish control. Alternatively, the fair port may wait until an entire sequence of frames is done transmitting before it closes the currently active loop circuit. In any case, the fair port relinquishes control of the loop 20 in response to the time period lapse.

The fair port will continue to send data across the second loop circuit until there is no more data to send and eventually close the loop circuit (Steps 300, 310).

In accordance with a further embodiment, the fair port may continue to establish additional/subsequent loop circuits (in sequence) with the destination ports on the loop (Steps 320, 340). (This includes the possibility of the fair port connecting to a different destination port and then to going back to an initial destination port to continue transmitting an additional frame sequence.) The transfer_state_count variable is used to identify when the number of transfer operations performed in a single loop tenancy is equal to an allowed max_transfer_count value (Step 330). This is similar to a time period lapse and provides another way to control loop monopolization by a single port, independent of the fact that arbitration was initially won "fairly".

The invention thus adapts the transfer protocol rules to allow connecting a current owner (initiator port) to multiple destination ports after an initial loop circuit is closed during a single loop tenancy, even when another destination port seeks control of the loop. In the preferred implementation, this may be performed by driver firmware located in the fair port and executed by an on-board processor (i.e., a CPU), or alternatively, by an application specific integrated circuit (ASIC). The firmware in the fair port processes a transfer operation for each of plural subsequent loop circuits to the various destination ports.

An embodiment of the present invention has been described. Nevertheless, it will be understood that various modifications may be made without departing from the spirit and scope of the invention. Moreover, as will be recognized by one skilled in the art, some of the processing steps are order-independent, and thus may be done in a sequence other than as described. Accordingly, it is to be understood that the invention is not to be limited by the specific illustrated embodiment, but only by the scope of the appended claims.

What is claimed is:

1. A method of transmitting sequences of frames across a loop by a fair port to a plurality of destination ports during a single loop tenancy of a Fibre Channel Arbitrated Loop access fairness window, comprising:

establishing by the fair port a first loop circuit with a first destination port;

closing the first loop circuit;

opening a second loop circuit between the fair port and a second destination port without the fair port relinquishing control to any arbitrating ports and without rearbitrating;

closing the second loop circuit; and opening a first number of subsequent loop circuits in sequence between the fair port and a second number of destination ports, the first loop circuit, the second loop circuit, and the first number of subsequent loop circuits all being opened during the single loop tenancy.

2. The method of claim 1, further comprising the step of identifying when to relinquish control of the loop.

3. The method of claim 2, wherein the step of identifying when to relinquish control involves identifying a maximum frame transmission period.

4. The method of claim 3, further comprising the steps of:

(a) identifying when the maximum frame transmission period lapses;

(b) identifying a current frame being transmitted at the end of the maximum frame transmission period; and (c) closing the last one of the subsequent loop circuits immediately after the current frame is transmitted.

5. The method of claim 3, further comprising the steps of:

a) identifying when the maximum frame transmission period lapses;

(b) identifying a current frame being transmitted at the end of the maximum frame transmission period; and (c) closing the last one of the subsequent loop circuits immediately after the last frame in the sequence of frames including the current frame is transmitted.

6. The method of claim 2, wherein the step of identifying when to relinquish control involves identifying when transmission of all said sequences of frames to all the destination ports has occurred.

7. The method of claim 2, further including the step of incrementing a transfer_state_4 count when a transfer operation is established, the step of identifying when to relinquish control involving comparing the transfer_state_count to a max_transfer_count.

8. The method of claim 1, wherein the first number is greater than the second number.

9. The method of claim 1, further comprising the steps of:

(a) closing the last one of the subsequent loop circuit between the fair port and the destination port after a last frame in the sequences of frames is transmitted; and (b) permitting another arbitrating port to establish a loop.

10. A computer program, stored in a computer-readable medium, for transmitting sequences of frames across a loop by a fair port to a plurality of destination ports during a single loop tenancy of a Fibre Channel Arbitrated Loop access fairness window, the computer program comprising instructions for causing a fair port to:

establish a first loop circuit with a first destination port;

close the first loop circuit; and open a second loop circuit between the fair port and a second destination port without the fair port relinquishing control to any arbitrating ports and without rearbitrating;

close the second loop circuit; and open a first number of subsequent loop circuits in sequence between the fair port and a second number of destination ports, the first loop circuit, the second loop circuit, and the first number of subsequent loop circuits all being opened during the single loop tenancy.

11. The computer program of claim 10, further comprising the instruction to identify when to relinquish control of the loop.

12. The computer program of claim 11, wherein the instruction to identify when to relinquish control involves identifying when a maximum frame transmission period lapses.

13. The computer program of claim 12, further comprising the instructions to:

(a) identify a current frame being transmitted at the end of the maximum frame transmission period; and (b) close the last one of the subsequent loop circuits immediately after the current frame is transmitted.

14. The computer program of claim 12, further comprising the instructions to:

(a) identify a current frame being transmitted at the end of the maximum frame transmission period; and (b) closing the last one of the subsequent loop circuits immediately after the entire sequence of frames including the current frame is transmitted.

15. The computer program of claim 11, wherein identifying when to relinquish control involves identifying when transmission of all said sequences of frames to all the destination ports has occurred.

16. The computer program of claim 11, further including instructions for incrementing a transfer_state_count each time a transfer operations is established, the instruction to identify when to relinquish control involving comparing the transfer_state_count to a max_transfer_count.

17. The computer program of claim 10, wherein the first number is greater than the second number.

18. The computer program of claim 10, further comprising instructions to:

(a) close the last one of the subsequent loop circuit between the fair port and the destination port after a last frame in the sequences of frames is transmitted; and (b) permit another arbitrating port to establish a loop.

* * * * *